(12) United States Patent
Agarwala et al.

(10) Patent No.: US 7,464,018 B2
(45) Date of Patent: *__Dec. 9, 2008__

(54) STALLING CPU PIPELINE TO PREVENT CORRUPTION IN TRACE WHILE MAINTAINING COHERENCY WITH ASYNCHRONOUS EVENTS

(75) Inventors: Manisha Agarwala, Richardson, TX (US); John M. Johnsen, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 391 days.

This patent is subject to a terminal disclaimer.

(21) Appl. No.: 11/456,972

(22) Filed: Jul. 12, 2006

(65) Prior Publication Data

US 2006/0265574 A1    Nov. 23, 2006

Related U.S. Application Data

(62) Division of application No. 10/302,022, filed on Nov. 22, 2002, now Pat. No. 7,099,817.

(51) Int. Cl.
G06F 9/455 (2006.01)
G06F 17/50 (2006.01)
H03K 19/00 (2006.01)
H03K 17/693 (2006.01)

(52) U.S. Cl. .............................. 703/23; 703/16; 703/26; 703/27; 716/4; 716/16; 716/17

(58) Field of Classification Search .................... 703/23; 712/218, 227, 244; 716/4, 16–17
See application file for complete search history.

(56) References Cited

U.S. PATENT DOCUMENTS

| | | | | |
|---|---|---|---|---|
| 5,970,241 | A * | 10/1999 | Deao et al. ................... | 712/227 |
| 6,243,836 | B1 * | 6/2001 | Whalen ........................ | 714/45 |
| 6,321,290 | B1 | 11/2001 | Yamashita | |
| 6,467,083 | B1 * | 10/2002 | Yamashita ................... | 717/128 |
| 6,615,370 | B1 * | 9/2003 | Edwards et al. ............... | 714/45 |
| 2002/0178405 | A1 * | 11/2002 | McCullough et al. ......... | 714/45 |
| 2002/0184477 | A1 * | 12/2002 | Swaine et al. ............... | 712/227 |
| 2003/0229823 | A1 | 12/2003 | Swaine et al. | |
| 2004/0102950 | A1 | 5/2004 | Agarwala et al. | |

* cited by examiner

Primary Examiner—Kamini S Shah
Assistant Examiner—David Silver
(74) Attorney, Agent, or Firm—Robert D. Marshall, Jr.; W. James Brady; Frederick J. Telecky, Jr.

(57) ABSTRACT

A method of preventing trace data first-in-first-out buffer overflow in a pipelined data processor stops new instructions when a trace data first-in-first-out buffer is in danger of overflowing. The method also stalls a predetermined number of pipeline stages in the pipeline ahead of the first pipeline stage. The trace data first-in-first-out buffer is emptied while the pipeline is stalled. On restart, the stalled pipeline stages are restarted ahead of re-enabling new instructions. Asynchronous trigger events received during the stall may be buffered and unrolled in order or merely stored and applied simultaneously on restart.

4 Claims, 4 Drawing Sheets

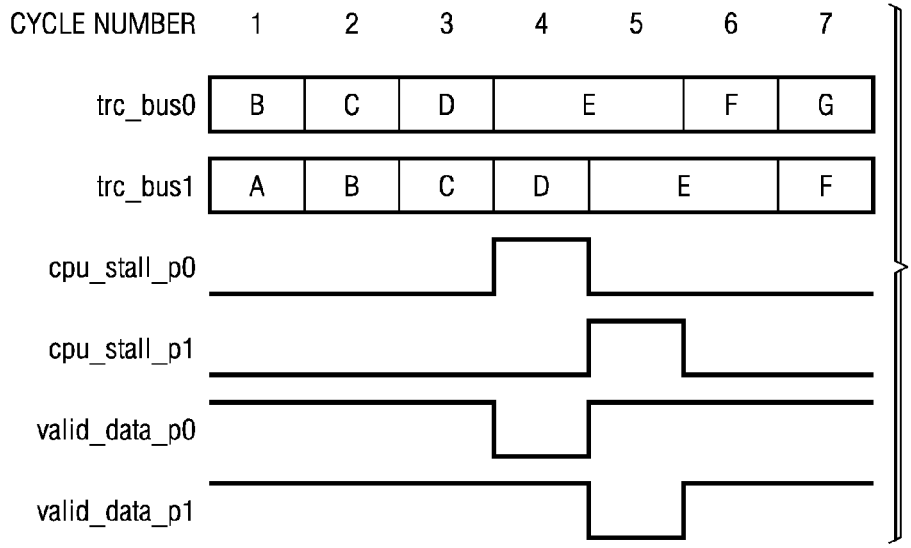
*FIG. 5*
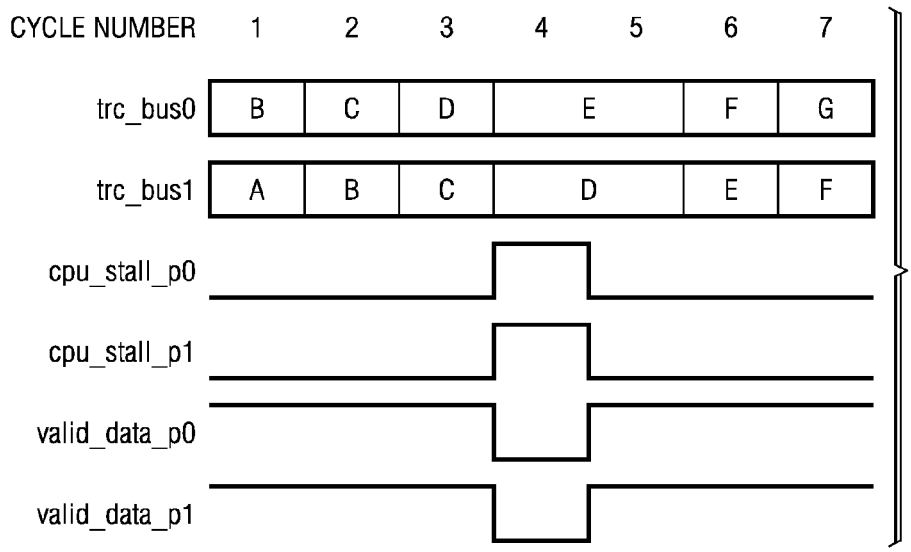
*FIG. 6*
| STAGE4 | A | B | C | D | E | F | G | H | I | J | K | |
|---|---|---|---|---|---|---|---|---|---|---|---|---|
| STAGE3 | A | B | C | D | E | F | G | H | I | J | K | |
| STAGE2 | A | B | C | D | E | F | G | H | I | J | K | |
| STAGE1 | A | B | C | D | E | F | G | H | I | J | K | |
*FIG. 7*
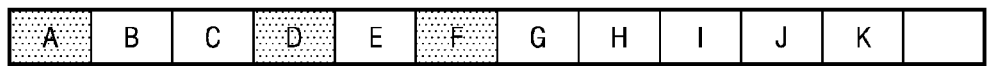
*FIG. 8*

STALLING CPU PIPELINE TO PREVENT CORRUPTION IN TRACE WHILE MAINTAINING COHERENCY WITH ASYNCHRONOUS EVENTS

This application is a divisional of U.S. patent application Ser. No. 10/302,022 filed Nov. 22, 2002 now U.S. Pat. No. 7,099,817.

TECHNICAL FIELD OF THE INVENTION

The technical field of this invention is emulation hardware particularly for highly integrated digital signal processing systems.

BACKGROUND OF THE INVENTION

Advanced wafer lithography and surface-mount packaging technology are integrating increasingly complex functions at both the silicon and printed circuit board level of electronic design. Diminished physical access to circuits for test and emulation is an unfortunate consequence of denser designs and shrinking interconnect pitch. Designed-in testability is needed so the finished product is both controllable and observable during test and debug. Any manufacturing defect is preferably detectable during final test before a product is shipped. This basic necessity is difficult to achieve for complex designs without taking testability into account in the logic design phase so automatic test equipment can test the product.

In addition to testing for functionality and for manufacturing defects, application software development requires a similar level of simulation, observability and controllability in the system or sub-system design phase. The emulation phase of design should ensure that a system of one or more ICs (integrated circuits) functions correctly in the end equipment or application when linked with the system software. With the increasing use of ICs in the automotive industry, telecommunications, defense systems, and life support systems, thorough testing and extensive real-time debug becomes a critical need.

Functional testing, where the designer generates test vectors to ensure conformance to specification, still remains a widely used test methodology. For very large systems this method proves inadequate in providing a high level of detectable fault coverage. Automatically generated test patterns are desirable for full testability, and controllability and observability. These are key goals that span the full hierarchy of test from the system level to the transistor level.

Another problem in large designs is the long time and substantial expense involved in design for test. It would be desirable to have testability circuitry, system and methods that are consistent with a concept of design-for-reusability. In this way, subsequent devices and systems can have a low marginal design cost for testability, simulation and emulation by reusing the testability, simulation and emulation circuitry, systems and methods that are implemented in an initial device. Without a proactive testability, simulation and emulation plan, a large amount of subsequent design time would be expended on test pattern creation and upgrading.

Even if a significant investment were made to design a module to be reusable and to fully create and grade its test patterns, subsequent use of a module may bury it in application specific logic. This would make its access difficult or impossible. Consequently, it is desirable to avoid this pitfall.

The advances of IC design are accompanied by decreased internal visibility and control, reduced fault coverage and reduced ability to toggle states, more test development and verification problems, increased complexity of design simulation and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment and tighter tolerances.

Emulation technology utilizing scan based emulation and multiprocessing debug was introduced more than 10 years ago. In 1988, the change from conventional in circuit emulation to scan based emulation was motivated by design cycle time pressures and newly available space for on-chip emulation. Design cycle time pressure was created by three factors. Higher integration levels, such as increased use of on-chip memory, demand more design time. Increasing clock rates mean that emulation support logic causes increased electrical intrusiveness. More sophisticated packaging causes emulator connectivity issues. Today these same factors, with new twists, are challenging the ability of a scan based emulator to deliver the system debug facilities needed by today's complex, higher clock rate, highly integrated designs. The resulting systems are smaller, faster, and cheaper. They have higher performance and footprints that are increasingly dense. Each of these positive system trends adversely affects the observation of system activity, the key enabler for rapid system development. The effect is called "vanishing visibility."

FIG. 1 illustrates the trend in visibility and control over time and greater system integration. Application developers prefer the optimum visibility level illustrated in FIG. 1. This optimum visibility level provides visibility and control of all relevant system activity. The steady progression of integration levels and increases in clock rates steadily decrease the actual visibility and control available over time. These forces create a visibility and control gap, the difference between the optimum visibility and control level and the actual level available. Over time, this gap will widen. Application development tool vendors are striving to minimize the gap growth rate. Development tools software and associated hardware components must do more with less resources and in different ways. Tackling this ease of use challenge is amplified by these forces.

With today's highly integrated System-On-a-Chip (SOC) technology, the visibility and control gap has widened dramatically over time. Traditional debug options such as logic analyzers and partitioned prototype systems are unable to keep pace with the integration levels and ever increasing clock rates of today's systems. As integration levels increase, system buses connecting numerous subsystem components move on chip, denying traditional logic analyzers access to these buses. With limited or no significant bus visibility, tools like logic analyzers cannot be used to view system activity or provide the trigger mechanisms needed to control the system under development. A loss of control accompanies this loss in visibility, as it is difficult to control things that are not accessible.

To combat this trend, system designers have worked to keep these buses exposed. Thus the system components were built in a way that enabled the construction of prototyping systems with exposed buses. This approach is also under siege from the ever-increasing march of system clock rates. As the central processing unit (CPU) clock rates increase, chip to chip interface speeds are not keeping pace. Developers find that a partitioned system's performance does not keep pace with its integrated counterpart, due to interface wait states added to compensate for lagging chip to chip communication rates. At some point, this performance degradation reaches intolerable levels and the partitioned prototype system is no longer a viable debug option. In the current era production devices must serve as the platform for application development.

Increasing CPU clock rates are also limiting availability of other simple visibility mechanisms. Since the CPU clock rates can exceed the maximum I/O state rates, visibility ports exporting information in native form can no longer keep up with the CPU. On-chip subsystems are also operated at clock rates that are slower than the CPU clock rate. This approach may be used to simplify system design and reduce power consumption. These developments mean simple visibility ports can no longer be counted on to deliver a clear view of CPU activity. As visibility and control diminish, the development tools used to develop the application become less productive. The tools also appear harder to use due to the increasing tool complexity required to maintain visibility and control. The visibility, control, and ease of use issues created by systems-on-a-chip tend to lengthen product development cycles.

Even as the integration trends present developers with a tough debug environment, they also present hope that new approaches to debug problems will emerge. The increased densities and clock rates that create development cycle time pressures also create opportunities to solve them. On-chip, debug facilities are more affordable than ever before. As high speed, high performance chips are increasingly dominated by very large memory structures, the system cost associated with the random logic accompanying the CPU and memory subsystems is dropping as a percentage of total system cost. The incremental cost of several thousand gates is at an all time low. Circuits of this size may in some cases be tucked into a corner of today's chip designs. The incremental cost per pin in today's high density packages has also dropped. This makes it easy to allocate more pins for debug. The combination of affordable gates and pins enables the deployment of new, on-chip emulation facilities needed to address the challenges created by systems-on-a-chip.

When production devices also serve as the application debug platform, they must provide sufficient debug capabilities to support time to market objectives. Since the debugging requirements vary with different applications, it is highly desirable to be able to adjust the on-chip debug facilities to balance time to market and cost needs. Since these on-chip capabilities affect the chip's recurring cost, the scalability of any solution is of primary importance. "Pay only for what you need" should be the guiding principle for on-chip tools deployment. In this new paradigm, the system architect may also specify the on-chip debug facilities along with the remainder of functionality, balancing chip cost constraints and the debug needs of the product development team.

FIG. 2 illustrates an emulator system 100 including four emulator components. These four components are: a debugger application program 110; a host computer 120; an emulation controller 130; and on-chip debug facilities 140. FIG. 2 illustrates the connections of these components. Host computer 120 is connected to an emulation controller 130 external to host 120. Emulation controller 130 is also connected to target system 140. The user preferably controls the target application on target system 140 through debugger application program 110.

Host computer 120 is generally a personal computer. Host computer 120 provides access the debug capabilities through emulator controller 130. Debugger application program 110 presents the debug capabilities in a user-friendly form via host computer 120. The debug resources are allocated by debug application program 110 on an as needed basis, relieving the user of this burden. Source level debug utilizes the debug resources, hiding their complexity from the user. Debugger application program 110 together with the on-chip trace and triggering facilities provide a means to select, record, and display chip activity of interest. Trace displays are automatically correlated to the source code that generated the trace log. The emulator provides both the debug control and trace recording function.

The debug facilities are preferably programmed using standard emulator debug accesses through a JTAG or similar serial debug interface. Since pins are at a premium, the preferred embodiment of the invention provides for the sharing of the debug pin pool by trace, trigger, and other debug functions with a small increment in silicon cost. Fixed pin formats may also be supported. When the pin sharing option is deployed, the debug pin utilization is determined at the beginning of each debug session before target system 140 is directed to run the application program. This maximizes the trace export bandwidth. Trace bandwidth is maximized by allocating the maximum number of pins to trace.

The debug capability and building blocks within a system may vary. Debugger application program 100 therefore establishes the configuration at runtime. This approach requires the hardware blocks to meet a set of constraints dealing with configuration and register organization. Other components provide a hardware search capability designed to locate the blocks and other peripherals in the system memory map. Debugger application program 110 uses a search facility to locate the resources. The address where the modules are located and a type ID uniquely identifies each block found. Once the IDs are found, a design database may be used to ascertain the exact configuration and all system inputs and outputs.

Host computer 120 generally includes at least 64 Mbytes of memory and is capable of running Windows 95, SR-2, Windows NT, or later versions of Windows. Host computer 120 must support one of the communications interfaces required by the emulator. These may include: Ethernet 10T and 100T, TCP/IP protocol; Universal Serial Bus (USB); Firewire IEEE 1394; and parallel port such as SPP, EPP and ECP.

Host computer 120 plays a major role in determining the real-time data exchange bandwidth. First, the host to emulator communication plays a major role in defining the maximum sustained real-time data exchange bandwidth because emulator controller 130 must empty its receive real-time data exchange buffers as fast as they are filled. Secondly, host computer 120 originating or receiving the real-time data exchange data must have sufficient processing capacity or disc bandwidth to sustain the preparation and transmission or processing and storing of the received real-time data exchange data. A state of the art personal computer with a Firewire communication channel (IEEE 1394) is preferred to obtain the highest real-time data exchange bandwidth. This bandwidth can be as much as ten times greater performance than other communication options.

Emulation controller 130 provides a bridge between host computer 120 and target system 140. Emulation controller 130 handles all debug information passed between debugger application program 110 running on host computer 120 and a target application executing on target system 140. A presently preferred minimum emulator configuration supports all of the following capabilities: real-time emulation; real-time data exchange; trace; and advanced analysis.

Emulation controller 130 preferably accesses real-time emulation capabilities such as execution control, memory, and register access via a 3, 4, or 5 bit scan based interface. Real-time data exchange capabilities can be accessed by scan or by using three higher bandwidth real-time data exchange formats that use direct target to emulator connections other than scan. The input and output triggers allow other system components to signal the chip with debug events and vice-versa. Bit I/O allows the emulator to stimulate or monitor system inputs and outputs. Bit I/O can be used to support factory test and other low bandwidth, non-time-critical emulator/target operations. Extended operating modes are used to specify device test and emulation operating modes. Emulator controller 130 is partitioned into communication and emulation sections. The communication section supports host communication links while the emulation section interfaces to the target, managing target debug functions and the device debug port. Emulation controller 130 communicates with host computer 120 using one of industry standard communication links outlined earlier herein. The host to emulator connection is established with off the shelf cabling technology. Host to emulator separation is governed by the standards applied to the interface used.

Emulation controller 130 communicates with the target system 140 through a target cable or cables. Debug, trace, triggers, and real-time data exchange capabilities share the target cable, and in some cases, the same device pins. More than one target cable may be required when the target system 140 deploys a trace width that cannot be accommodated in a single cable. All trace, real-time data exchange, and debug communication occurs over this link. Emulator controller 130 preferably allows for a target to emulator separation of at least two feet. This emulation technology is capable of test clock rates up to 50 MHZ and trace clock rates from 200 to 300 MHZ, or higher. Even though the emulator design uses techniques that should relax target system 140 constraints, signaling between emulator controller 130 and target system 140 at these rates requires design diligence. This emulation technology may impose restrictions on the placement of chip debug pins, board layout, and requires precise pin timings. On-chip pin macros are provided to assist in meeting timing constraints.

The on-chip debug facilities offer the developer a rich set of development capability in a two tiered, scalable approach. The first tier delivers functionality utilizing the real-time emulation capability built into a CPU's mega-modules. This real-time emulation capability has fixed functionality and is permanently part of the CPU while the high performance real-time data exchange, advanced analysis, and trace functions are added outside of the core in most cases. The capabilities are individually selected for addition to a chip. The addition of emulation peripherals to the system design creates the second tier functionality. A cost-effective library of emulation peripherals contains the building blocks to create systems and permits the construction of advanced analysis, high performance real-time data exchange, and trace capabilities. In the preferred embodiment five standard debug configurations are offered, although custom configurations are also supported. The specific configurations are covered later herein.

SUMMARY OF THE INVENTION

Emulation trace generates data streams for tracing target processor activity. When multiple trace data streams are enabled, they are written at different times into individual first-in-first-out (FIFO) buffers. It is possible that the trace data input rate may be higher than the data output rate. In such a case this invention stalls the central processing unit. This stops generation of trace data and therefore no trace data is lost.

BRIEF DESCRIPTION OF THE DRAWINGS

These and other aspects of this invention are illustrated in the drawings, in which:

FIG. 5 illustrates the process of a central processing unit pipeline stall including pipeline stage inhibition;

FIG. 6 illustrates elastic buffering of asynchronous trigger events during a pipeline stall; and FIG. 7 illustrates simultaneous application of asynchronous trigger events received during a pipeline stall upon restart.

DETAILED DESCRIPTION OF PREFERRED EMBODIMENTS

When the streams are switched on or off using the triggers, markers are generated. Various streams are synchronized using markers called sync points. The sync points provide a unique identifier field and a context to the data that will follow it. All streams may generate a sync point with this unique identifier. The information in the sync point is valid only at a legal instruction boundary.

Figure 1:
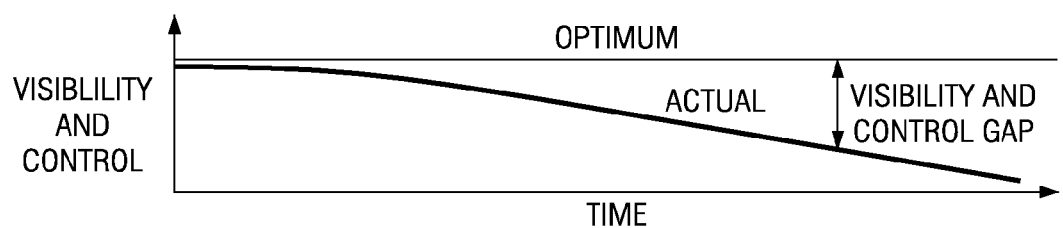
FIG. 1 illustrates the visibility and control of typical integrated circuits as a function of time due to increasing system integration.
Figure 2:
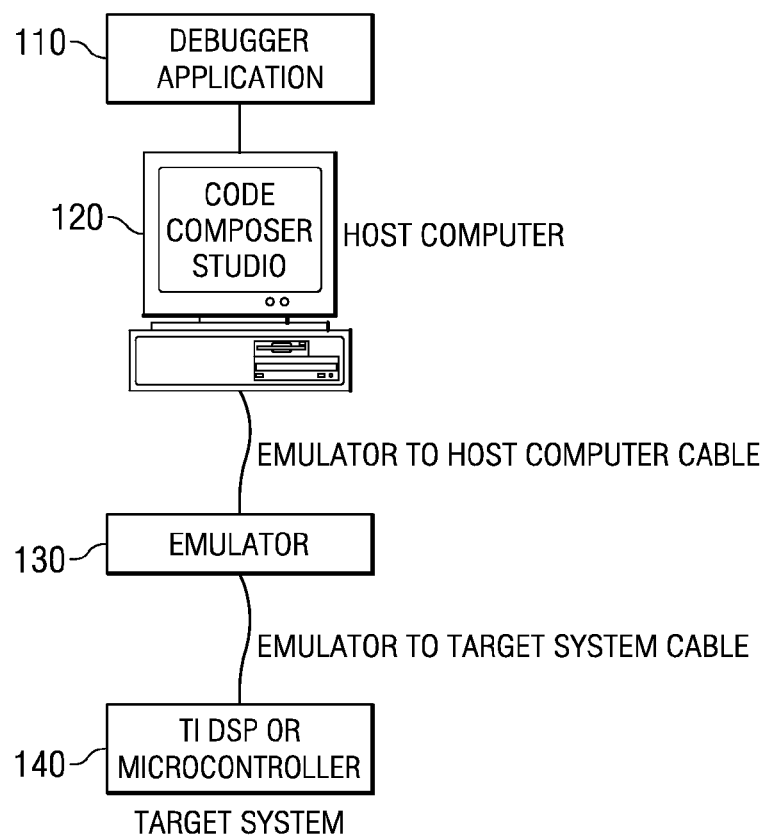
FIG. 2 illustrates an emulation system to which this invention is applicable.
Figure 3:
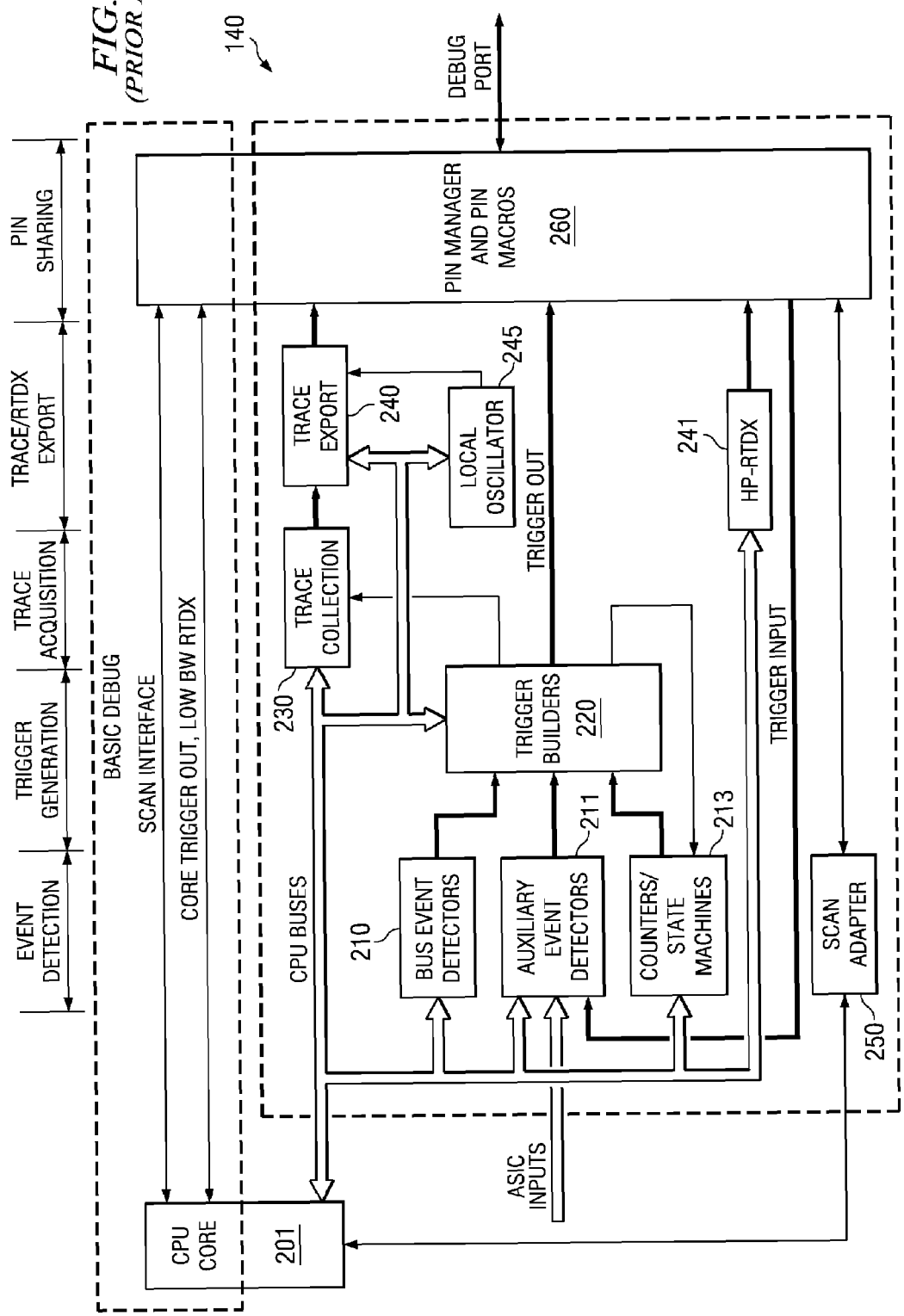
FIG. 3 illustrates in block diagram form a typical integrated circuit employing configurable emulation capability.

FIG. 3 illustrates an example of one on-chip debug architecture embodying target system 140. The architecture uses several module classes to create the debug function. One of these classes is event detectors including bus event detectors 210, auxiliary event detectors 211 and counters/state machines 213. A second class of modules is trigger generators including trigger builders 220. A third class of modules is data acquisition including trace collection 230 and formatting. A fourth class of modules is data export including trace export 240, and real-time data exchange export 241. Trace export 240 is controlled by clock signals from local oscillator 245. Local oscillator 245 will be described in detail below. A final class of modules is scan adaptor 250, which interfaces scan input/output to CPU core 201. Final data formatting and pin selection occurs in pin manager and pin micros 260.

The size of the debug function and its associated capabilities for any particular embodiment of a system-on-chip may be adjusted by either deleting complete functions or limiting the number of event detectors and trigger builders deployed. Additionally, the trace function can be incrementally increased from program counter trace only to program counter and data trace along with ASIC and CPU generated data. The real-time data exchange function may also be optionally deployed. The ability to customize on-chip tools changes the application development paradigm. Historically, all chip designs with a given CPU core were limited to a fixed set of debug capability. Now, an optimized debug capability is available for each chip design. This paradigm change gives system architects the tools needed to manage product development risk at an affordable cost. Note that the same CPU core may be used with differing peripherals with differing pin outs to embody differing system-on-chip products. These differing embodiments may require differing debug and emulation resources. The modularity of this invention permits each such embodiment to include only the necessary debug and emulation resources for the particular system-on-chip application.

The real-time emulation debug infrastructure component is used to tackle basic debug and instrumentation operations related to application development. It contains all execution control and register visibility capabilities and a minimal set of real-time data exchange and analysis such as breakpoint and watchpoint capabilities. These debug operations use on-chip hardware facilities to control the execution of the application and gain access to registers and memory. Some of the debug operations which may be supported by real-time emulation are: setting a software breakpoint and observing the machine state at that point; single step code advance to observe exact instruction by instruction decision making; detecting a spurious write to a known memory location; and viewing and changing memory and peripheral registers.

Real-time emulation facilities are incorporated into a CPU mega-module and are woven into the fabric of CPU core 201. This assures designs using CPU core 201 have sufficient debug facilities to support debugger application program 110 baseline debug, instrumentation, and data transfer capabilities. Each CPU core 201 incorporates a baseline set of emulation capabilities. These capabilities include but are not limited to: execution control such as run, single instruction step, halt and free run; displaying and modifying registers and memory; breakpoints including software and minimal hardware program breakpoints; and watchpoints including minimal hardware data breakpoints.

Consider the case of tracing processor activity and generating timing, program counter and data streams. Table 1 shows the streams generated when a sync point is generated. Context information is provided only in the program counter stream. There is no order dependency of the various streams with each other except that the sync point identifiers cannot exceed each other by more than 7. Therefore, if program counter stream has yet to send out program counter sync point of id=1, then timing stream could have sent out it's sync points with ids from 1 to 7. The timing stream cannot send out it's next sync point of 1. Within each stream the order cannot be changed between sync points.

TABLE 1

| Timing stream | PC stream | Data stream |
| --- | --- | --- |
| Timing sync point, id = 1 | PC sync point, id = 1 | Data sync point, id = 1 |
| Timing data | PC data | Memory Data |
| Timing data | | Memory Data |
| Timing data | PC data | Memory Data |
| Timing data | PC data | Memory Data |
| Timing sync point, id = 2 | PC sync point, id = 2 | Data sync point, id = 2 |

The program counter stream is further classified into exceptions, relative branches, absolute branches and sync points. Since the data size for each of these sub-streams is different there is a separate FIFO buffer for each of them. There are the following FIFO buffers:

1. A timing FIFO has both timing data and timing sync points.
2. A program counter sync point FIFO keeps track of the program counter sync points in the program counter stream.
3. An exceptions FIFO keeps track of all exception information in the program counter stream.
4. An absolute branches FIFO keeps track of the registered branches in the program counter stream.
5. A relative branches FIFO keeps track of the relative branch packets in the program counter stream.
6. A program counter overall FIFO (val FIFO) keeps track of the order of program counter data (program counter sync points, exceptions, absolute branches, relative branches) being written in the various program counter streams.
7. An memory FIFO has both data logs and data sync points.

The timing trace stream gets the highest priority on the read side. The program counter trace stream gets the next highest priority. The data trace stream gets the lowest priority.

Figure 4:
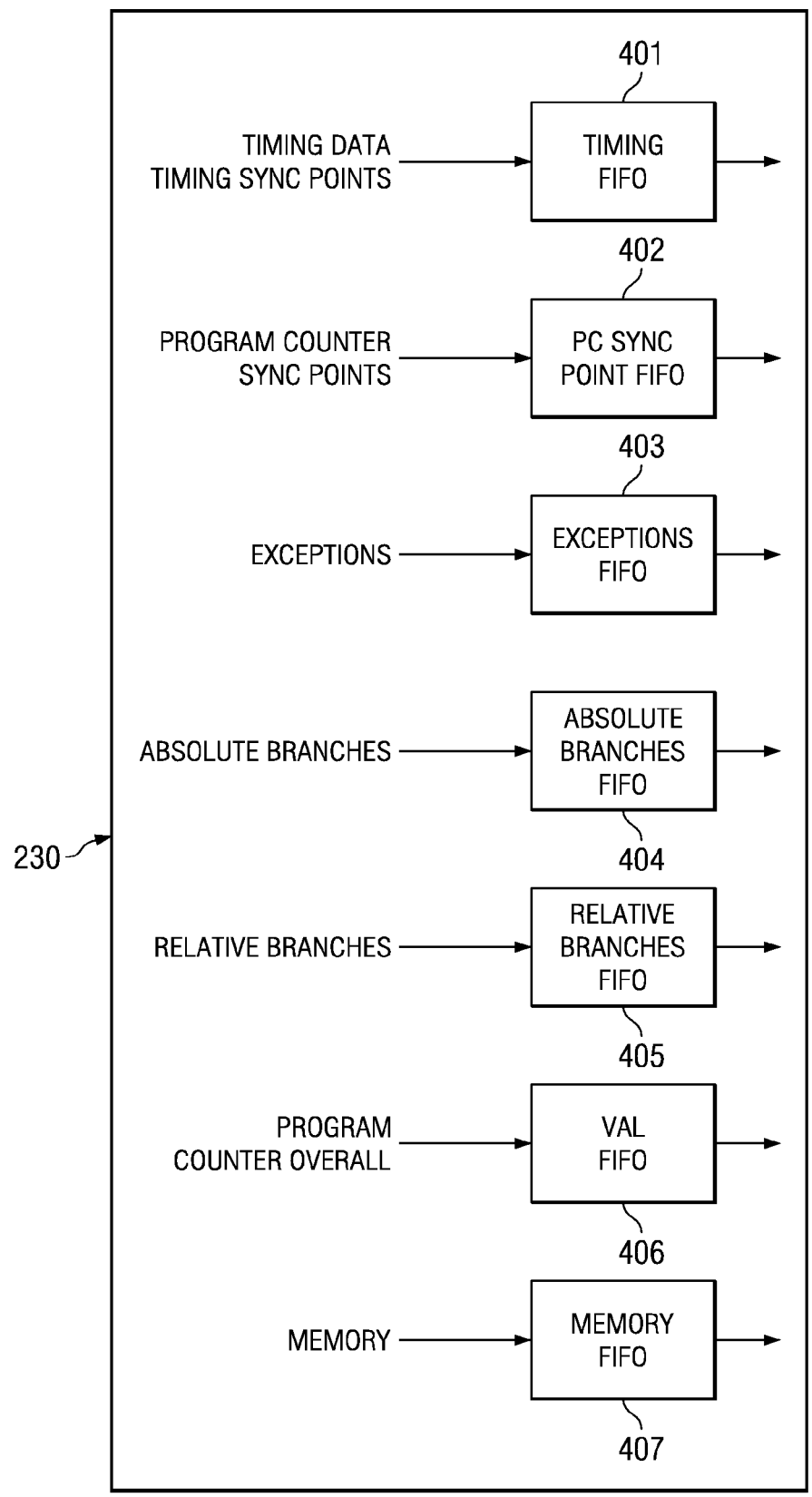
FIG. 4 illustrates the process of a central processing unit pipeline stall without pipeline stage inhibition.

FIG. 4 illustrates the pipeline progresses for the case of a normal central processing unit stall. Trace bus 0 (trc_bus0) is for stage 0 e.g.) and trace bus 1 is for (trc_bus1). The cpu_stall_p0 signal is the stall information associated with stage 0 and the cpu_stall_p1 signal is the stall information associated with stage 1. The A, B, C, D, E, F and G indicate the new data values. The data is not valid as long as the cpu_stall signal is high for the respective pipeline stage.

FIG. 4 shows the cpu_stall_p0 signal goes high in cycle 4. The data from pipeline stage 0 is valid then as indicated by the valid_data_p0 signal. Note that the data from pipeline stage 1 becomes valid in cycle 5 as indicated by the valid_data_p1 signal. Thus all the data in the prior cycles trickles down the following pipeline stage. If the trace logic depends only on the stall from the central processing unit to prevent overflow, there is still too much data coming into the FIFO in the worst case. Thus the data will still corrupt. The simplest solution would be to double the size of each FIFO buffer. This is very expensive in terms of the hardware.

This invention maintains the same depth for the FIFO buffers. However, for a central processing unit stall initiated by the trace logic, the pipeline activity changes to that illustrated in FIG. 5. The hardware predicts that based on the current FIFO buffer situation, in the worst-case scenario, will the FIFO buffer corrupt. If that is the case then it sends a stall request to the central processing unit. Since trace has generated the stall request, after a known number of cycles the central processing unit must respond. Based on this knowledge trace hardware intercepts the pipeline, stalls it a few cycles earlier and saves the stream from getting corrupted. Thus cpu_stall_p0 and cpu_stall_p1 signals become identical and are referred to as acqn_stall signal. The data valid signals valid_data_p0 and valid_data_p1 also occur simultaneously.

Similarly when the potential FIFO buffer overflow is resolved and acqn_stall signal becomes inactive, the central processing unit stall ends after a known number of cycles. It is possible that the cpu_stall signal may continue to be active due to some other reason. Therefore on restarting the pipeline, the acqn_stall signal going inactive starts the pipeline ahead of the cpu_stall signal going inactive. Trace hardware also transmits the data held due to acqn_stall signal being active. In FIG. 5, data D would normally be sent out without the acqn_stall signal. However with acqn_stall signal active this data is held in pipeline stage 1.

This scheme works for synchronous events. There is a possibility that there are asynchronous events. Asynchronous event may be generated while the predicted stall has stopped the various pipeline stages from progressing. There are multiple solutions for this problem. If providing additional hardware is not a problem, these asynchronous events can be queued in buffer that is as deep as the number of stages that are artificially held due to the acqn_stall signal. This type buffer is called an elastic buffer. Such an elastic buffer can hold all asynchronous activity for the extra cycles when the central processing unit is not really stalled, but the acqn_stall signal interrupts the progress of the various pipeline stages. Accuracy of behavior of the triggers is maintained in this case.

FIG. 6 illustrates an example of the use of this elastic buffer. During stage 1 when the acqn_stall signal is active and the cpu_stall signal is inactive, event A occurs. During stage 2, while the cpu_stall signal is still inactive, no events happen. During stage 3, event F occurs and event D occurs during stage 4. Following stage 4 the cpu_stall signal becomes active in response to acqn_stall signal. Thereafter no more events are possible until the stall ends. When the acqn_stall becomes inactive, events A, F and D can be de-queued since they are stored in cycle accurate order.

FIG. 7 illustrates a simpler scheme. Assume there is no depth associated with saving the asynchronous events that occurred during the small window of artificial stall. Any and all asynchronous events received during this window are treated as sticky events. Thus events A, D and F are stored without tracking their relative receipt time. When pipeline advance resumes at the end of the trace stall, all these events affect trace at the same time. They are treated as simultaneous events even though they occurred in different clock cycles. This scheme substantially reduces the amount of hardware required, at the cost of a little inaccuracy.

What is claimed is:

1. A data processor integrated circuit comprising:
   a data processor (210) generating trace data;
   a trace data collection unit (230) connected to said data processor and receiving said trace data;
   a trace data export unit (240) connected to said trace data collection unit including at least one trace data first-in-first-out buffer, said trace data export unit operable to
      determine when a trace data first-in-first-out buffer is in danger of overflowing;
      upon determination that the trace data first-in-first-out buffer is in danger of overflowing
         stalling a predetermined number of pipeline stages in the pipeline following a first pipeline stage,
         inhibiting a central processing unit of the data processor from beginning a new instruction,
         transmitting data from the trace data first-in-first-out buffer while the pipeline is stalled;
      during any interval between stalling the predetermined number of pipeline stages and when the central processing unit is inhibited from beginning a new instruction, buffer in a first-in-first-out buffer any received asynchronous trig ger events, and
      before restarting the predetermined number of pipeline stages, transmit data from the trace data first-in-first-out buffer corresponding to the received asynchronous events.

2. The data processor integrated circuit of claim 1, wherein:
   said trace data export unit is further operable to
      following transmitting data from the trace data first-in-first-out buffer
         determine the trace data first-in-first-out buffer is no longer in danger of overflowing,
         restart the predetermined number of pipeline stages, and
         permit the central processing unit to begin new instructions.

3. The data processor integrated circuit comprising:
   a data processor (210) generating trace data;
   a trace data collection unit (230) connected to said data processor and receiving said trace data;
   a trace data export unit (240) connected to said trace data collection unit including at least one trace data first-in-first-out buffer, said trace data export unit operable to
      determine when a trace data first-in-first-out buffer is in danger of overflowing;
      upon determination that the trace data first-in-first-out buffer is in danger of overflowing
         stalling a predetermined number of pipeline stages in the pipeline following a first pipeline stage,
         inhibiting a central processing unit of the data processor from beginning a new instruction,
         transmitting data from the trace data first-in-first-out buffer while the pipeline is stalled;
      during any interval between stalling the predetermined number of pipeline stages and when the central processing unit is inhibited from beginning a new instruction, store an indication of any received asynchronous trigger events, and
      before restarting the predetermined number of pipeline stages, simultaneously apply the stored asynchronous trigger events.

4. The data processor integrated circuit of claim 3, wherein:
   said trace data export unit is further operable to
      following transmitting data from the trace data first-in-first-out buffer
         determine the trace data first-in-first-out buffer is no longer in danger of overflowing,
         restart the predetermined number of pipeline stages, and
         permit the central processing unit to begin new instructions.

* * * * *